United States Patent
Chiang et al.

(10) Patent No.: US 9,600,387 B2
(45) Date of Patent: Mar. 21, 2017

(54) PROVIDING EFFICIENT DATA REPLICATION FOR A TRANSACTION PROCESSING SERVER

(71) Applicant: International Business Machines Corporation, Armonk, NY (US)

(72) Inventors: Johnson Y S Chiang, Taipei (TW); Jeffrey C H Liu, Taipei (TW); Chih-Wen Su, Taipei (TW); Ying-Kai Wang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 14/225,563

(22) Filed: Mar. 26, 2014

(65) Prior Publication Data
US 2014/0297591 A1    Oct. 2, 2014

(30) Foreign Application Priority Data
Mar. 30, 2013   (TW) .............................. 102111625 A (51) Int. Cl.
*G06F 17/30*   (2006.01)
*G06F 11/30*   (2006.01)
*G06F 11/20*   (2006.01)

(52) U.S. Cl.
CPC ...... *G06F 11/3034* (2013.01); *G06F 11/2094* (2013.01); *G06F 11/2097* (2013.01)

(58) Field of Classification Search
CPC ............. G06F 11/3034; G06F 11/2094; G06F 11/2097
See application file for complete search history.

(56) References Cited

U.S. PATENT DOCUMENTS 5,633,931 A *   5/1997   Wright ................. H04L 9/3247
                                                    380/30
5,796,934 A     8/1998   Bhanot et al.
5,812,793 A     9/1998   Shakib et al.
(Continued)

FOREIGN PATENT DOCUMENTS

TW        I266986 B      11/2006
TW        M439847 U      10/2012

OTHER PUBLICATIONS

"Method and System for Transmitting Data for Backup and Recovery in a Database Appliance," IP.com Prior Art Database Technical Disclosure No. IPCOM000218256D, May 30, 2012, 6 pages.
(Continued)

*Primary Examiner* — Apu Mofiz
*Assistant Examiner* — Jared Bibbee
(74) *Attorney, Agent, or Firm* — Yee & Associates, P.C.; Stephen R. Yoder (57) ABSTRACT

Providing efficient data replication for a transaction processing server is provided. A notification is received from the transaction processing server which completes a transaction of a message. The notification includes a message digest and a message identifier. The message identifier in the received notification is compared with a stored message identifier. In response to a match of the comparing of the message identifier, the message digest in the received notification is compared with a stored message digest. In response to a match of the comparing of the message digest, a stored input message is directly stored in a physical storage.

20 Claims, 4 Drawing Sheets

(56) References Cited

U.S. PATENT DOCUMENTS

| | | | |
|---|---|---|---|
| 6,021,491 A * | 2/2000 | Renaud | G06F 21/64 |
| | | | 713/179 |
| 7,228,459 B2 | 6/2007 | Jiang et al. | |
| 7,685,384 B2 | 3/2010 | Shavit | |
| 7,711,986 B2 | 5/2010 | Ozawa et al. | |
| 7,801,135 B2 | 9/2010 | Appanna et al. | |
| 2004/0177100 A1* | 9/2004 | Bjorner | G06F 12/0253 |
| 2004/0266533 A1 | 12/2004 | Gentles et al. | |
| 2005/0125423 A1 | 6/2005 | Chou et al. | |
| 2005/0177603 A1* | 8/2005 | Shavit | G06F 11/2074 |
| 2006/0053077 A1* | 3/2006 | Mourad | G06F 17/3089 |
| | | | 705/51 |
| 2006/0174129 A1* | 8/2006 | Brignone | H04L 9/3236 |
| | | | 713/181 |
| 2006/0182050 A1 | 8/2006 | Dohm | |
| 2007/0112887 A1* | 5/2007 | Liu | G06F 17/30575 |
| 2007/0288536 A1 | 12/2007 | Sen et al. | |
| 2008/0046714 A1* | 2/2008 | Suganthi | H04L 63/0428 |
| | | | 713/150 |
| 2008/0046717 A1* | 2/2008 | Kanekar | H04L 63/166 |
| | | | 713/156 |
| 2009/0138531 A1 | 5/2009 | Horii | |
| 2010/0011031 A1* | 1/2010 | Huang | G06F 21/552 |
| | | | 707/E17.007 |
| 2010/0179984 A1* | 7/2010 | Sebastian | H04L 12/1859 |
| | | | 709/203 |
| 2010/0241595 A1* | 9/2010 | Felsher | G06F 19/322 |
| | | | 705/400 |
| 2010/0281263 A1* | 11/2010 | Ugawa | G11B 20/00086 |
| | | | 713/176 |
| 2012/0089578 A1* | 4/2012 | Lam | G06F 17/30159 |
| | | | 707/692 |
| 2012/0290537 A1* | 11/2012 | Smith | G06F 3/0608 |
| | | | 707/654 |
| 2013/0054524 A1* | 2/2013 | Anglin | G06F 17/30575 |
| | | | 707/624 |
| 2014/0025948 A1* | 1/2014 | Bestler | H04L 9/0863 |
| | | | 713/167 |
| 2014/0032960 A1* | 1/2014 | Konishi | G06F 11/1456 |
| | | | 714/6.3 |

OTHER PUBLICATIONS

Renuga et al., "Balanced and Efficient Data Placement and Replication Strategy for Distributed Backup Storage Systems," International Conference on Computational Science and Engineering, Aug. 2009, pp. 87-94.

"Solution Brief: Network-Based Backup and Data Replication," Riverbed Technology, Oct. 2010, 3 pages.

* cited by examiner

# PROVIDING EFFICIENT DATA REPLICATION FOR A TRANSACTION PROCESSING SERVER

This Application is a counterpart of and claims the benefit of priority to Taiwan Patent Application No. 102111625, filed on Mar. 30, 2013, the contents of which are hereby incorporated by reference.

BACKGROUND

1. Field

The present invention relates to efficient data replication and backup, and more particularly, to a method, a backup server, and a computer program product for enabling a transaction processing server to perform efficient data replication and backup.

2. Description of the Related Art

From the perspective of most enterprise applications, especially B2B applications (in the B2B message-related field, for example), the capability of maintaining non-repudiation of data is not only inevitably an important dimension of the applications, but also the key to the success of enterprise business. Hence, most enterprise applications require keeping received transaction data (wire-in) and sending transaction data (wire-out) to ensure that the applications will each have a copy which serves as a piece of evidence and thus effectuates non-repudiation of data. However, as in the case of most B2B message applications, the payloads of files increase greatly (to, say, 100M-1G) with the size or quantity of the files; as a result, it poses an enormous challenge to most B2B applications in terms of storing the payloads efficiently and still maintaining high message throughout (i.e., the number of transactions conducted per second).

Figure 1:
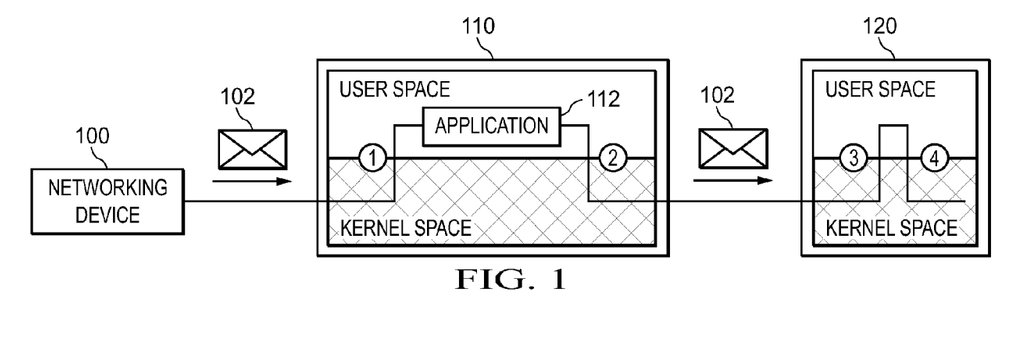
FIG. 1 is a schematic view of a message process flow of an illustrative framework of a conventional typical B2B application.

FIG. 1 is a schematic view, of a message process flow of an illustrative framework of a conventional typical B2B application. A transaction processing server 110 provides an application 112 (such as stock trading) for receiving an input message 102 from the client. The input message 102 either originates from an external client device directly or is sent to the transaction processing server 110 via a networking device 100. The input message 102 is a packet or a transaction. The networking device 100 is a device capable of controlling the direction of the flow of network packets and is exemplified by an exchanger, a router, or a hub. For the details of the framework of the networking device 100, make reference to Cisco's exchanger product Cisco Catalyst 3550 Series Switch. The transaction processing server 110 stores correctable data by a transaction and usually applies to systems of banking, stocks and securities transaction. A transaction requests that data stored in a transaction processing server be read, written, or updated. In general, a transaction includes ordering, purchasing, changing, creating, and deleting. For further details of the transaction processing server, make reference to WebSphere DataPower B2B Appliance v5.0.

In general, the process flow of the B2B application is as follows:

1) After the transaction processing server 110 has received the input message 102, the input message 102 is sent from the kernel space of the transaction processing server 110 to the application 112 on a user space.

2) The application 112 of the transaction processing server 110 analyzes and processes the input message 102. Afterward, the input message 102 is sent from the user space to the kernel space, so as to be replicated by a transaction backup server 120. The transaction backup server 120 gives backup to a local storage or sends it to a remote storage server (such as NES/CIFS/ISCSI) of NAS; meanwhile, the message is transmitted via a network. For details of the storage server, make reference to NAS Server on Ubuntu 11.10. When necessary, the input message 102 which has been processed can also be sent from the user space to the kernel space, so as to be replicated by the transaction backup server 120.

3) An operating system of the transaction backup server 120 copies the input message 102 received from the transaction processing server 110 from the kernel space to a daemon, such as an NFS daemon, on the user space.

4) The NFS daemon stores the input message 102 in a physical storage, such as a hard disk drive or an array of hard disk drives (RAID), of the transaction backup server 120.

The aforesaid conventional process flow involves a latency of heavy I/O operation, regardless of whether network-based transmission takes place between the user space and the kernel space, or between the transaction processing server 110 and the transaction backup server 120. Hence, the latency of the heavy I/O operation becomes the performance bottleneck of overall throughout.

Accordingly, it is advantageous to reduce unnecessary I/O operation between the transaction processing server 110 and the transaction backup server 120.

SUMMARY

According to one or more embodiments of the present invention, a transaction backup server monitors (or, also known as "sniffers") and replicates a message packet whose destination is a transaction processing server, such that the transaction processing server and the transaction backup server receive the transaction message simultaneously to thereby reduce unnecessary I/O copying operation.

The present invention, in an embodiment thereof, provides a method for enabling a transaction processing server to perform efficient data replication. The method comprises the steps of: receiving a notification from the transaction processing server having completed a transaction of a message, the notification including a message digest and a message identifier (message ID); comparing the message ID in the notification received with a stored message ID; comparing the message digest in the notification received with a stored message digest in response to a match of the message ID; and storing a stored input message directly in a physical storage in response to a match of the message digest.

According to another embodiment of the present invention, a computer program product comprises a computer-readable medium having a program code stored therein to implement the aforesaid method when executed on an information apparatus, thereby enabling a transaction processing server to perform efficient data replication.

According to another embodiment of the present invention, an information apparatus comprises a bus, a memory, and a processing unit. The memory is connected to the bus, wherein the memory includes instructions. The processing unit is connected to the bus, wherein the processing unit executes the instructions to implement the aforesaid method, thereby enabling a transaction processing server to perform efficient data replication.

Reference throughout this specification to features, advantages, or similar language does not imply that all of the features and advantages that may be realized with embodiments of the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of embodiments of the invention will be readily understood, a more particular description of the embodiments of the invention briefly described above will be rendered by reference to specific embodiments that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings.

DETAILED DESCRIPTION

In order that the advantages of embodiments of the invention will be readily understood, a more particular description of the embodiments of the invention briefly described above will be rendered by reference to specific embodiments that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings.

As will be appreciated by one skilled in the art, the embodiments of the present invention may be embodied as an appliance, a method, or a computer program product. Accordingly, embodiments of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, embodiments of the present invention may take the form of a computer program product embodied in any tangible storage medium of expression having computer-usable program code embodied in the storage medium.

Any combination of one or more computer-usable or computer-readable storage medium(s) may be utilized. The computer-usable or computer-readable storage medium may be, for example but not limited to, an electronic, magnetic, optical, electromagnetic, infrared, or semiconductor system, apparatus, device, or propagation medium. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, store, communicate, propagate, or transport the program for use by or in connection with the instruction execution system, apparatus, or device. The computer-usable storage medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Referring now to FIG. 1 through FIG. 5, systems, methods, and computer program products are illustrated as structural or functional block diagrams or process flowcharts according to various embodiments of the present invention. The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
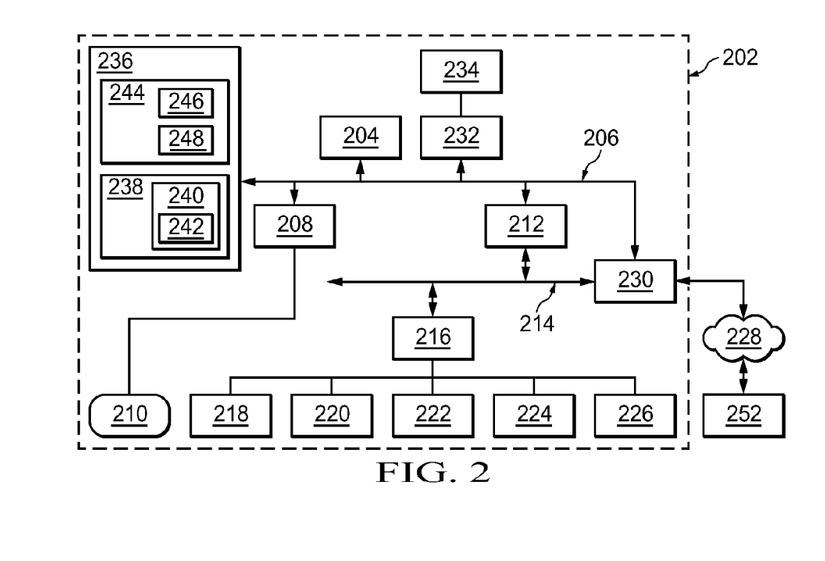
FIG. 2 is a block diagram of an illustrative hardware environment of a transaction processing server or a transaction backup server according to an embodiments of the present invention.

FIG. 2 is a block diagram of an illustrative hardware environment of a transaction processing server or a transaction backup server 202 according to the present invention. In an exemplary embodiment, a server is a universal desktop computer comprising: a processor for executing various applications; a storage device for storing various information and program code; a display device, a communication device, and an input/output device which function as interfaces for communicating with a user; and a peripheral component or other components serving a specific purpose. In another embodiment, the present invention is implemented in another way and thus having less or more other devices or components. The network can also be implemented in any form of a connection, including a fixed connection, such as a local area network (LAN) or a wide area network (WAN), or getting connected to the Internet through a dial-up connection provided by an Internet service provider (ISP). The network connection is not restricted to cable connection and wireless connection; instead, it can also be implemented by wireless connection in the form of a GSM connection or a Wi-Fi connection for communicating with a client computer. The network further comprises other hardware and software components (not shown), such as an additional computer system, router, and firewall.

As shown in FIG. 2, a server 202 includes a processor unit 204 coupled to a system bus 206. Also coupled to system bus 206 is a video adapter 208, which drives/supports a display 210. System bus 206 is coupled via a bus bridge 212 to an Input/Output (I/O) bus 214. Coupled to I/O bus 214 is an I/O interface 216, which affords communication with various I/O devices, including a keyboard 218, a mouse 220, a Compact Disk-Read Only Memory (CD-ROM) 222, a floppy disk drive 224, and a flash drive memory 226. The format of the ports connected to I/O interface 216 may be any known to those skilled in the art of computer architecture, including but not limited to Universal Serial Bus (USB) ports.

The server 202 is able to communicate with a service provider server 252 via a network 228 using a network interface 230, which is coupled to system bus 206. Network 228 may be an external network such as the Internet, or an internal network such as an Ethernet or a Virtual Private Network (VPN). Using network 228, the server 202 is able to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes server 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc. As depicted, OS 238 also includes kernel 242, which includes lower levels of functionality for OS 238, including providing essential services required by other parts of OS 238 and application programs 244, including memory management, process and task management, disk management, and mouse and keyboard management.

The hardware framework of other computer or server 252 is identical or similar to that of the server 202, or is any conventional basic framework, and the present invention is not limited thereto. For example, other computer 252 is a desktop computer, a notebook computer, a personal digital assistant (PDA), or a smartphone. However, FIG. 2 and the above examples are not restrictive of the present invention. Other computer 252 comprises a browser. The browser comprises a program module and instructions. The program module and commands comply with the Hypertext Transfer Protocol (HTTP) whereby a World Wide Web (WWW)

client (i.e., other computer or server 252) sends and receives web-based messages through the Internet and communicate with the server 202.

The application program 244 comprises a packet sniffing module 246 and a storage buffer managing module 248. The packet sniffing module 246 and the storage buffer managing module 248 include program modules and instructions. The program modules and instructions communicate with another computer or server 252 to sniff and replicate a message packet delivered to a destination. In fact, the packet sniffing module 246 and the storage buffer managing module 248 are either modules within an application program or are implemented by means of a daemon (that is, come in the form of modules of an application program or come in the form of a daemon). However, in another embodiment, the packet sniffing module 246 and the storage buffer managing module 248 are implemented by a program in another form. The packet sniffing module 246 and the storage buffer managing module 248 include codes for carrying out the processes illustrated with FIGS. 4 and 5 and described below.

The hardware elements depicted in the server 202 are not intended to be exhaustive, but rather are representative to highlight essential components required by the present invention. For instance, the server 202 may include alternate memory storage devices such as magnetic cassettes, Digital Versatile Disks (DVDs), Bernoulli cartridges, and the like. These and other variations are intended to be within the spirit and scope of the present invention.

Figure 3:
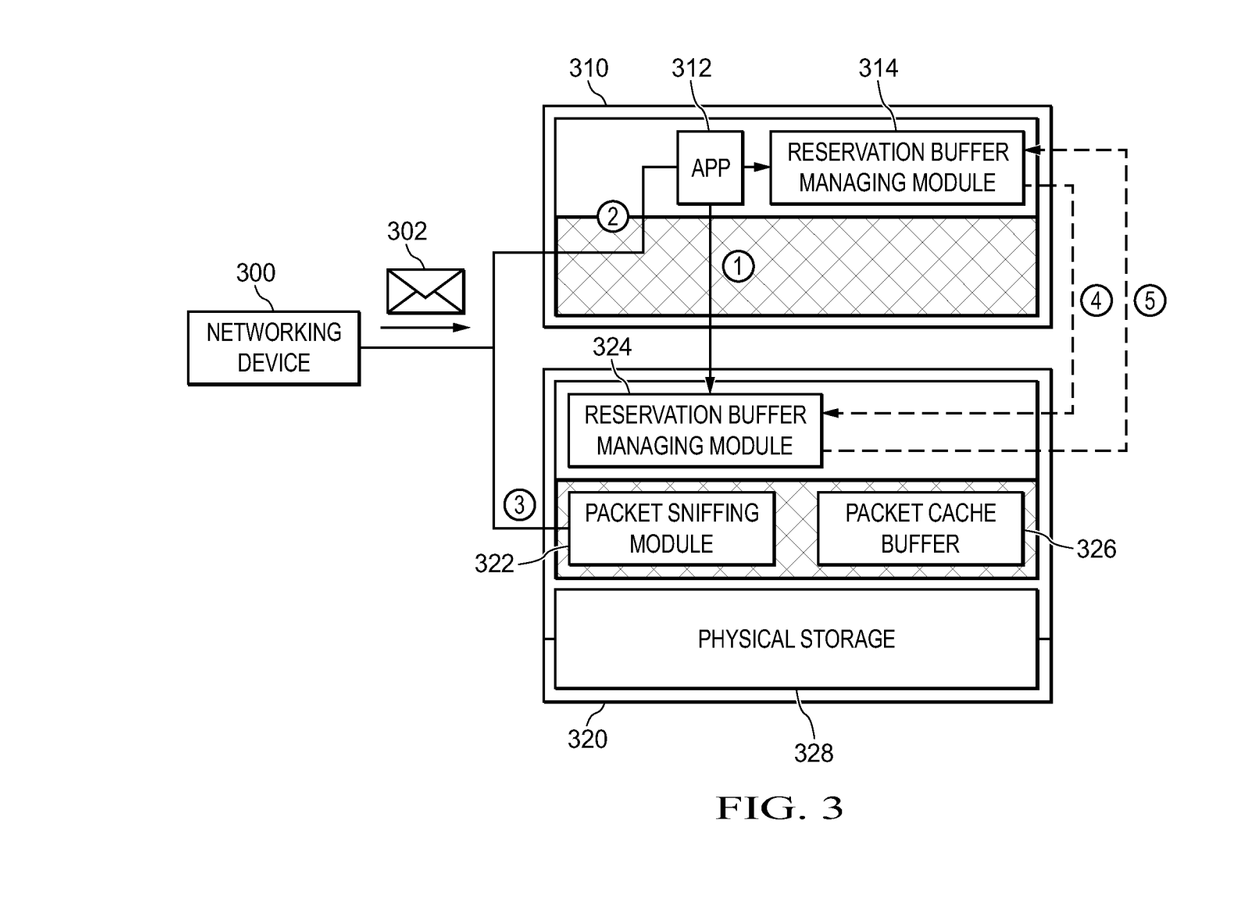
FIG. 3 is a schematic view of a message process flow of an illustrative framework of a B2B application according to an embodiment of the present invention.

FIG. 3 is a schematic view of a message process flow of an illustrative framework of a B2B application according to an embodiment of the present invention. As shown in the diagram, the illustrative framework of a B2B application comprises a transaction processing server 310 and a transaction backup server 320 positioned in the same network segment. The transaction processing server 310 provides an application 312 for receiving an input message 302 from the client. The input message 302 either originates from an external client device (such as a computer) directly or is sent to the transaction processing server 310 via a networking device 300. The networking device 300 is a device capable of controlling the direction of the flow of network packets and is exemplified by an exchanger, a router, or a hub. In an embodiment of the present invention, the process flow of the B2B application is as follows:

1) The transaction processing server 310 configures the IP address and port of the transaction backup server 320 specified to thereby create a message transmission path. Hence, the credential of the transaction processing server 310 is transmitted to a reservation buffer managing module 324 of the transaction backup server 320 so as to enable the decryption operation of a transmission layer (for example, decryption of SSL). In fact, it is feasible that the transaction backup server 320 be configured as a reliable server for the transaction processing server 310 beforehand; as a result, the transmission of the credential is optional rather than required.

2) To allow the exchanger or hub to send the input message 302, the application 312 on the user space receives the input message 302 from the kernel space of the transaction processing server 310.

3) A packet sniffing module 322 of the transaction backup server 320 monitors continuously a message packet whose destination is the transaction processing server 310, and thus the packet sniffing module 322 also receives a copy of the input message 302. With the credential attributed to the transaction processing server 310 and received by the reservation buffer managing module 324, the packet sniffing module 322 decrypts the input message 302 and stores the input message 302 in a packet cache buffer 326.

The message digest and message ID are stored in the reservation buffer managing module 324. The message digest is a checksum of the contents of the message or is obtained by means of hashing or MD5.

4) After the transaction processing server 310 has completed the message transaction and decided to keep (or discard) the message, a reservation buffer managing module 314 of the transaction processing server 310 sends a notification to the reservation buffer managing module 324 of the transaction backup server 320. The notification comprises the message digest and the message ID. The message digest and the message ID are for use in identifying the transaction of a message.

The reservation buffer managing module 324 compares the message digest and message ID in the notification received and the message digest and message ID stored in the reservation buffer managing module 324. If the comparison yields a match in whole, the packet cache buffer 326 will directly copy the stored input message 302 to a physical storage 328, such as a hard disk drive or a RAID.

If the matching process has not been finished in a specific period of time, the reservation buffer managing module 324 will simply discard message data stored in the packet cache buffer 326 and indicated by the same message ID.

5) After the aforesaid comparing step, the reservation buffer managing module 324 sends an affirmative confirmation (or a negative confirmation) to the reservation buffer managing module 314 of the transaction processing server 310. If the reservation buffer managing module 314 receives a negative confirmation, the whole message will be sent to the transaction backup server 320 and stored therein. In doing so, an embodiment of the present invention ensures that message data will be kept securely, even in the worst situation, such as timeout.

Figure 4:
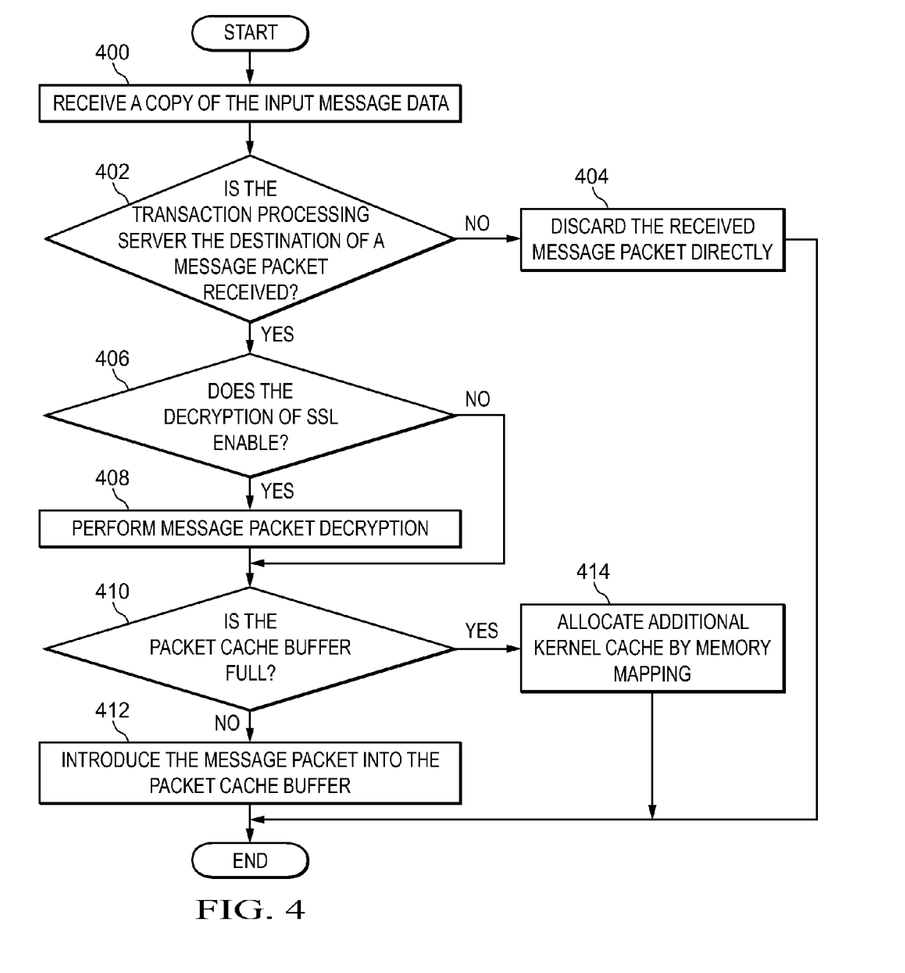
FIG. 4 is a flow chart of a method for a packet sniffing module of the transaction backup server according to an embodiment of the present invention.

FIG. 4 is a flow chart of a method for a packet sniffing module of the transaction backup server according to an embodiment of the present invention. FIG. 4 illustrates an embodiment of the present invention in conjunction with FIG. 3.

Step 400: the packet sniffing module 322 monitors continuously message data whose destination is the transaction processing server 310 and thus also receives a copy of the input message data 302.

Step 402: determine whether the destination of a message packet received is the transaction processing server 310, and discard the received message packet directly if its destination is not the transaction processing server 310 (step 404).

Step 406: determine whether to enable decryption operation of a transmission layer (for example, decryption of SSL) to thereby decrypt the received message packet, that is, determine whether the decryption is enabled by a credential received by the reservation buffer managing module 324. Perform message packet decryption when the determination is affirmative (step 408).

Step 410: determine whether the packet cache buffer 326 is full. Introduce the message packet into the packet ache buffer 326 when it is determined that the packet cache buffer 326 is not full (step 412).

Step 414: allocate additional kernel cache by memory mapping, such as mmap, when it is determined that the packet cache buffer 326 is full.

Figure 5:
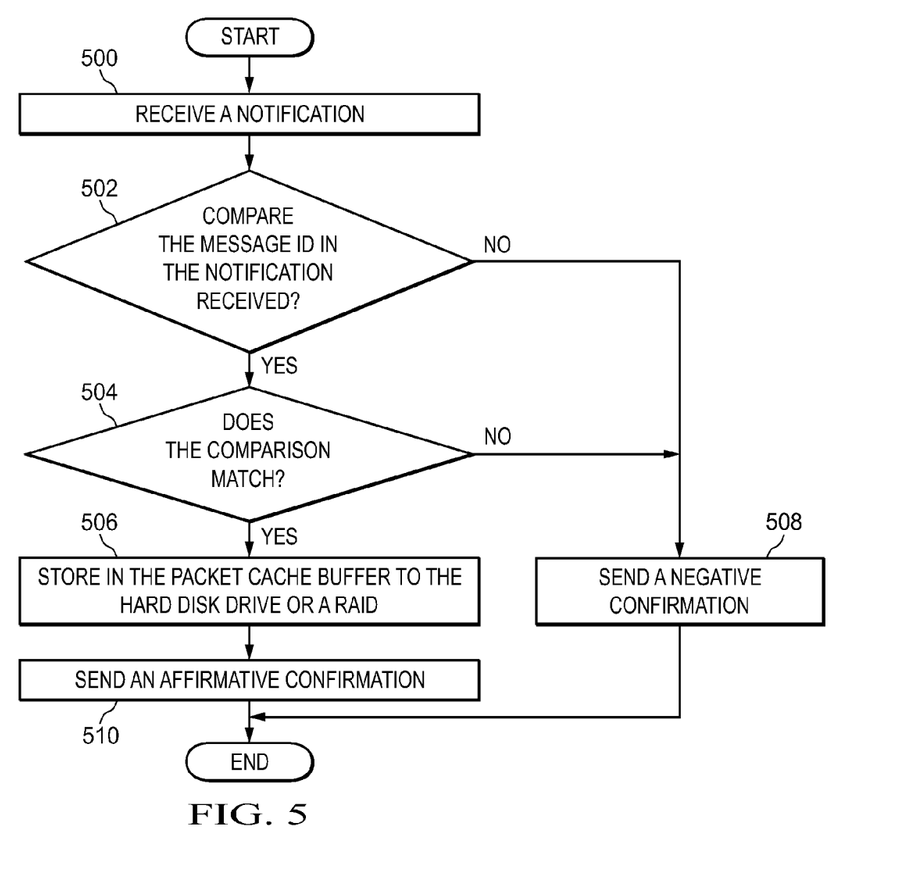
FIG. 5 is a flow chart of a method for a storage buffer managing module of the transaction backup server according to an embodiment of the present invention.

FIG. 5 is a flow chart of a method for a storage buffer managing module of the transaction backup server according to an embodiment of the present invention. FIG. 5 illustrates an embodiment of the present invention in conjunction with FIG. 3.

The reservation buffer managing module 324 compares the message digest and message ID in the notification received and the message digest and message ID stored in the reservation buffer managing module 324. If the comparison yields a match in whole, the packet cache buffer 326 will directly copy the stored input message 302 to the physical storage 328, such as a hard disk drive or a RAID.

Step 500: as described before, after the transaction processing server 310 has completed the message transaction and decided to keep (or discard) the message, the reservation buffer managing module 314 of the transaction processing server 310 sends a notification to the reservation buffer managing module 324 of the transaction backup server 320. The storage buffer managing module 324 receives the notification. As described before, the notification comprises the message digest and the message ID.

Step 502: the reservation buffer managing module 324 compares the message ID in the notification received and the message ID stored in the reservation buffer managing module 324. If the comparison does not yield any match, a negative confirmation will be sent to the reservation buffer managing module 314 (step 508).

Step 504: if the comparison yields a match, compare the message digest in the notification received and the message digest stored in the reservation buffer managing module 324. If the comparison does not yield any match, a negative confirmation will be sent back to the reservation buffer managing module 314 (step 508). Then, the reservation buffer managing module 324 simply discards message data stored in the packet cache buffer 326 and indicated by the same message ID. Furthermore, after the reservation buffer managing module 314 has received the negative confirmation, the whole message is sent to the transaction backup server 320 and stored therein. In doing so, an embodiment of the present invention ensures that message data will be kept securely, even in the worst situation, such as timeout.

Step 506: if the comparison yields a match, the packet cache buffer 326 will directly copy the input message 302 stored in the packet cache buffer 326 to the physical storage 328, such as a hard disk drive or a RAID, and send an affirmative confirmation back to the reservation buffer managing module 314 (step 510).

As described before, the present invention is not limited to the environment of the switch illustrated with the aforesaid embodiments. In fact, the environment of a hub applies to the present invention as well. In the environment of a hub, a message packet is replicated and sent to all devices connected with the hub. In the environment of the exchanger, a message packet is sent to a related port with authority. Today, most switches are characterized by port mapping whereby a message packet is replicated at a port and sent to another port preconfigured.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method performed by a transaction backup server for enabling a transaction processing server to perform efficient data replication on the transaction backup server, the method comprising:
   receiving and storing, by the transaction backup server, an input message;
   receiving, by the transaction backup server, a notification from the transaction processing server having completed a transaction of a message, the notification including a message digest and a message identifier (message ID) associated with the message;
   comparing, by the transaction backup server, the message ID in the notification received and a stored message ID obtained from the input message that was previously received and stored by the transaction backup server;
   comparing, by the transaction backup server in response to a match of the message ID, the message digest in the notification received and a stored message digest obtained from the input message that was previously received and stored by the transaction backup server; and
   storing, by the transaction backup server in response to a match of the message digest, the stored input message directly in a physical storage.

2. The method of claim 1, further comprising:
   sending a negative confirmation back to the transaction processing server when the comparing does not yield any match.

3. The method of claim 2, wherein the sending of the negative confirmation further comprises:
   discarding an input message stored and indicated by a same message ID.

4. The method of claim 2, wherein the sending of the negative confirmation further comprises:
   storing the message sent from the transaction processing server.

5. The method of claim 1, wherein the physical storage is a hard disk drive or a RAID.

6. The method of claim 1, wherein the message is from one of a switch, a router, and a hub.

7. The method of claim 1, wherein the message digest is a checksum of contents of the message or is obtained by hashing or MD5.

8. A computer program product for enabling a transaction processing server to perform efficient data replication on a transaction backup server, the computer program product comprising a non-transitory computer-readable storage medium having program instructions stored therein that when executed by a computer cause the computer to perform a method of:
   receiving and storing, by the transaction backup server, an input message;
   receiving, by the transaction backup server, a notification from the transaction processing server having completed a transaction of a message, the notification including a message digest and a message identifier (message ID) associated with the message;
   comparing, by the transaction backup server, the message ID in the notification received and a stored message ID obtained from the input message that was previously received and stored by the transaction backup server;
   comparing, by the transaction backup server in response to a match of the message ID, the message digest in the notification received and a stored message digest obtained from the input message that was previously received and stored by the transaction backup server; and storing, by the transaction backup server in response to a match of the message digest, the stored input message directly in a physical storage.

9. The computer program product of claim 8, further comprising:
sending a negative confirmation back to the transaction processing server when the comparing does not yield any match.

10. The computer program product of claim 9, wherein the sending of the negative confirmation further comprises:
discarding an input message stored and indicated by a same message ID.

11. The computer program product of claim 9, wherein the sending of the negative confirmation further comprises:
storing the message sent from the transaction processing server.

12. The computer program product of claim 8, wherein the physical storage is a hard disk drive or a RAID.

13. The computer program product of claim 8, wherein the message is from one of a switch, a router, and a hub.

14. The computer program product of claim 8, wherein the message digest is a checksum of contents of the message or is obtained by hashing or MD5.

15. A backup server for enabling a transaction processing server to perform efficient data replication on a transaction backup server, the backup server comprising:
a bus;
a memory connected to the bus, wherein the memory stores instructions; and
a processor unit connected to the bus, wherein the processor unit executes the instructions to receive and store, by the transaction backup server, an input message; receive, by the transaction backup server, a notification from the transaction processing server having completed a transaction of a message, the notification including a message digest and a message identifier (message ID) associated with the message; compare, by the transaction backup server, the message ID in the notification received and a stored message ID obtained from the input message that was previously received and stored by the transaction backup server; compare, by the transaction backup server in response to a match of the message ID, the message digest in the notification received and a stored message digest obtained from the input message that was previously received and stored by the transaction backup server; and store, by the transaction backup server in response to a match of the message digest, the stored input message directly in a physical storage.

16. The backup server of claim 15, wherein the processor unit further executes the instructions to send a negative confirmation back to the transaction processing server when comparing does not yield any match.

17. The backup server of claim 16, wherein sending the negative confirmation further comprises discarding an input message stored and indicated by a same message ID.

18. The backup server of claim 16, wherein sending the negative confirmation further comprises storing the message sent from the transaction processing server.

19. The backup server of claim 15, wherein the physical storage is a hard disk drive or a RAID.

20. The backup server of claim 15, wherein the backup server gives backup to a remote storage server of NAS, the remote storage server being one of NFS/CIFS/ISCSI.

* * * * *